US012707498B2

(12) United States Patent
Hoppe et al.

(10) Patent No.: US 12,707,498 B2
(45) Date of Patent: Aug. 11, 2026

(54) APPARATUSES AND METHODS FOR ENHANCEMENT OF CELL RECONNECTION FOR CLIENT NODES IN NON-TERRESTRIAL NETWORKS

(71) Applicant: Nokia Technologies Oy, Espoo (FI)

(72) Inventors: Sandra Hoppe, Munich (DE); Jeroen Wigard, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 500 days.

(21) Appl. No.: 18/255,279

(22) PCT Filed: Nov. 17, 2021

(86) PCT No.: PCT/EP2021/081949
§ 371 (c)(1),
(2) Date: May 31, 2023

(87) PCT Pub. No.: WO2022/117339
PCT Pub. Date: Jun. 9, 2022

(65) Prior Publication Data

US 2024/0032097 A1 Jan. 25, 2024

(30) Foreign Application Priority Data

Dec. 2, 2020 (FI) .................................... 20206238

(51) Int. Cl.
*H04W 74/04* (2009.01)
*H04W 74/0816* (2024.01)

(52) U.S. Cl.
CPC ....... *H04W 74/0816* (2013.01); *H04W 74/04* (2013.01)

(58) Field of Classification Search
CPC . H04W 74/04; H04W 74/0816; H04W 84/06; H04W 76/28; Y02D 30/70
See application file for complete search history.

(56) References Cited

U.S. PATENT DOCUMENTS

2015/0304883 A1 10/2015 Tabet et al.
2016/0353372 A1 12/2016 Bishop, Jr. et al.
2017/0289907 A1 10/2017 Ang et al.
2019/0045437 A1 2/2019 Krishnamoorthy et al.
2019/0058522 A1* 2/2019 Haley .................... G06F 16/23
(Continued)

FOREIGN PATENT DOCUMENTS

CN 110636550 A 12/2019

OTHER PUBLICATIONS

English Machine Translation of CN110636550 (Year: 2019).*
(Continued)

*Primary Examiner* — James P Duffy
(74) *Attorney, Agent, or Firm* — Barta Jones, PLLC

(57) ABSTRACT

Example embodiments provide signaling between a network node and a client node in non-terrestrial network which enables optimizing energy consumption of the client node. The client node may adapt its power saving mode duration to end at a suitable time for transmission based on information about transmission opportunities computed by the network node. The network nodes may be moving network nodes that operate at altitude, such as satellites. Apparatuses, methods, and computer programs are disclosed.

5 Claims, 4 Drawing Sheets

(56) References Cited

U.S. PATENT DOCUMENTS

2021/0344436 A1* 11/2021 Zhou .................... H04J 11/0069
2021/0345424 A1* 11/2021 Cirik ..................... H04W 72/23

OTHER PUBLICATIONS

"3rd Generation Partnership Project; Technical Specification Group Radio Access Network; NR; Medium Access Control (MAC) protocol specification (Release 16)", 3GPP TS 38.321, V16.2.1. Sep. 2020, pp. 1-154.
"Solutions for NR to support non-terrestrial networks (Ntn)", 3GPP TSG RAN meeting #86, RP-193234, Agenda: 9.1.2, Thales, Dec. 9-13, 2019, 10 pages.
"Considerations on mobility management in Ntn", 3GPP TSG-RAN WG2 Meeting #104, R2-1818248, Agenda: 11.6.4.1, Huawei, Nov. 12-16, 2018, 4 pages.
"Cell Selection and Reselection Issue in NTN System", 3GPP TSG-RAN WG2 Meeting #107, R2-1908753, Agenda: 11.6.4.2, CATT, Aug. 26-30, 2019, pp. 1-3.
"Improving Cell Reselection using Next Cell Information in NTN", 3GPP TSG-RAN WG2 Meeting #107, R2-1908857, Agenda: 11.6.3.1, MediaTek USA Inc, May 26-30, 2019, 3 pages.
"IEEE 802.11", Wikipedia, Retrieved on Jun. 7, 2023, Webpage available at : https://en.wikipedia.org/wiki/IEEE_802.11.
Office action received for corresponding Finnish Patent Application No. 20206238, dated Apr. 29, 2021, 10 pages.
"3rd Generation Partnership Project; Technical Specification Group Radio Access Network; Solutions for NR to support non-terrestrial networks (NTN) (Release 16)", 3GPP TR 38.821, V16.0.0, Dec. 2019, pp. 1-140.
"3rd Generation Partnership Project; Technical Specification Group Radio Access Network; Study on New Radio (NR) to support non-terrestrial networks (Release 15)", 3GPP TR 38.811, V15.4.0, Sep. 2020, pp. 1-127.
"3rd Generation Partnership Project; Technical Specification Group Radio Access Network; Study on Narrow-Band Internet of Things (NB-IOT) / enhanced Machine Type Communication (eMTC) support for Non-Terrestrial Networks (NTN) (Release 17)", 3GPP TR 36.763, V0.1.0, Mar. 2021, pp. 1-29.
Office action received for corresponding Finnish Patent Application No. 20206238, dated Oct. 29, 2021, 9 pages.
International Search Report and Written Opinion received for corresponding Patent Cooperation Treaty Application No. PCT/EP2021/081949, dated Feb. 7, 2022, 13 pages.

* cited by examiner

APPARATUSES AND METHODS FOR ENHANCEMENT OF CELL RECONNECTION FOR CLIENT NODES IN NON-TERRESTRIAL NETWORKS

RELATED APPLICATION

This application claims priority to PCT Application No. PCT/EP2021/081949, filed on Nov. 17, 2021, which claims priority from FI Application No. 20206238, filed on Dec. 2, 2020, each of which is incorporated herein by reference in its entirety.

TECHNICAL FIELD

The present application generally relates to wireless communication systems. In particular, some example embodiments of the present application relate to enhancement of cell reconnection for client nodes, such as IoT (Internet of things) devices, in non-terrestrial networks.

BACKGROUND

Solutions for NR (new radio) to support non-terrestrial networks (NTN) are needed. In this context, NTN includes all networks or segments of networks which use an airborne or spaceborne platform as a part of the network, such as satellites, high-altitude platforms such as balloons, aircraft or drones. The drone may be any unmanned aircraft that can navigate autonomously without human control, remotely by a human, or beyond line of sight. Satellites can be classified in terms of their altitude, from low-Earth orbit (LEO) to geostationary Earth orbit (GEO) satellites. LEO satellites are deployed in large constellations and move with respect to the Earth's surface. Their advantage is global and high-speed communication with a low delay in comparison to traditional Geostationary Earth orbit (GEO) satellites. The movement of the LEO satellite with respect to the Earth is one of the main challenges for LEO communications.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments may enable optimization of energy consumption of electronic devices. A client node may be configured to enquire network about a transmission opportunity for adaption of a power saving mode of the client node based on the time of the transmission opportunity. Alternatively, the network may automatically inform the client node about the transmission opportunities based on scheduled transmission times of the client nodes known by the network. This enables, that the client node may extend or shorten set power saving time such that the client node activates for transmission at a suitable transmission time. The suitable transmission time may be based on availability of the network for the client node determined by the network. Hence, battery power may be saved because it may be prevented that the client node activates too early and has to wait for the transmission opportunity. Further, additional information may be provided to the client node with the transmission opportunity to reduce overhead in reconnecting after the power saving mode. This may be achieved by the features of the independent claims. Further implementation forms are provided in the dependent claims, the description, and the drawings.

According to a first aspect, an apparatus may comprise at least one processor; and at least one memory including computer program code; the at least one memory and the computer code configured to, with the at least one processor, cause the apparatus at least to receive, from a network node, information comprising an indication of at least one transmission opportunity based on at least one scheduled transmission time of the apparatus; and determine duration of power saving mode of the apparatus based on the at least one transmission opportunity.

According to an example embodiment of the first aspect, the at least one memory and the computer code may be further configured to, with the at least one processor, cause the apparatus to send an inquiry to the network node for transmission opportunities based on the at least one scheduled transmission time of the apparatus indicated in the inquiry.

According to an example embodiment of the first aspect, the information may comprise assisting parameters associated with the at least one transmission opportunity for reconnection after the power saving mode.

According to an example embodiment of the first aspect, the assisting parameters may comprise at least one of a physical cell identity, a time of availability of network, random access control channel opportunities or a random access control channel preamble.

According to an example embodiment of the first aspect, the time of availability may comprise an indication of a most suitable time or time slot for the transmission by the apparatus.

According to an example embodiment of the first aspect, the at least one scheduled transmission time may comprise a next transmission time, a next transmission time window or a transmission time interval of the apparatus for sending data.

According to a second aspect, an apparatus may comprise at least one processor; and at least one memory including computer program code; the at least one memory and the computer code configured to, with the at least one processor, cause the apparatus at least to obtain at least one scheduled transmission time of a client node; compute at least one transmission opportunity for the client node based on the at least one scheduled transmission time of the client node and availability of network for the client node; and send information comprising an indication of the at least one transmission opportunity to the client node.

According to an example embodiment of the second aspect, the at least one scheduled transmission time may be obtained based on an inquiry from the client node for the transmission opportunities, the transmission time comprising a next transmission time, a next transmission time period or a transmission time interval of the client node.

According to an example embodiment of the second aspect, the at least one scheduled transmission time may be obtained based on a time period between previous transmission times of the client node.

According to an example embodiment of the second aspect, the at least one memory and the computer code may be further configured to, with the at least one processor, cause the apparatus to compute assisting parameters associated with the transmission opportunity for reconnection by the client node; and wherein the information comprises the assisting parameters.

According to an example embodiment of the second aspect, the transmission opportunity may be computed based on at least one of a location of the client node or an ephemeris data associated with network nodes.

According to an example embodiment of the second aspect, the assisting parameters may comprise at least one of a physical cell identity, a time of availability of the network, random access control channel opportunities or a random access control channel preamble.

According to an example embodiment of the second aspect, the at least one memory and the computer code may be further configured to, with the at least one processor, cause the apparatus to reserve the at least one transmission opportunity to the client node.

According to a third aspect, a method may comprise receiving, from a network node, information comprising an indication of at least one transmission opportunity based on at least one scheduled transmission time of a client node; and determining duration of power saving mode of the client node based on the at least one transmission opportunity.

According to an example embodiment of the third aspect, the method may further comprise sending an inquiry to the network node for transmission opportunities based on the at least one scheduled transmission time of the client node indicated in the inquiry.

According to an example embodiment of the third aspect, the information may comprise assisting parameters associated with the at least one transmission opportunity for reconnection by the client node after the power saving mode.

According to an example embodiment of the third aspect, the assisting parameters may comprise at least one of a physical cell identity, a time of availability of network, random access control channel opportunities or a random access control channel preamble.

According to an example embodiment of the third aspect, the time of availability of the network may comprise an indication of a most suitable time or time slot for the transmission.

According to an example embodiment of the third aspect, the at least one scheduled transmission time may comprise a next transmission time, a next transmission time window or a transmission time interval of the client node for sending data.

According to a fourth aspect, a method may comprise obtaining at least one scheduled transmission time of a client node; computing at least one transmission opportunity for the client node based on the at least one scheduled transmission time and availability of network for the client node; and sending information comprising an indication of the at least one transmission opportunity to the client node.

According to an example embodiment of the fourth aspect, the at least one scheduled transmission time may be obtained based on an inquiry from the client node for the transmission opportunities, the transmission time comprising a next transmission time, a next transmission time period or a transmission time interval of the client node.

According to an example embodiment of the fourth aspect, the at least one scheduled transmission time may be obtained based on a time period between previous transmission times of the client node.

According to an example embodiment of the fourth aspect, the method may comprise computing assisting parameters associated with the transmission opportunity for reconnection by the client node; and wherein the information comprises the assisting parameters.

According to an example embodiment of the fourth aspect, the transmission opportunity may be computed based on at least one of a location of the client node or an ephemeris data associated with network nodes.

According to an example embodiment of the fourth aspect, the assisting parameters may comprise at least one of a physical cell identity, a time of availability of network, random access control channel opportunities or a random access control channel preamble.

According to a fifth aspect, a computer program may be configured, when executed by a processor, to cause an apparatus at least to perform the following: receive, from a network node, information comprising an indication of at least one transmission opportunity based on at least one scheduled transmission time of the apparatus; and determine duration of power saving mode of the apparatus based on the at least one transmission opportunity. The computer program may further comprise instructions for causing the apparatus to perform any example embodiment of the method of the third aspect.

According to a sixth aspect, an apparatus may comprise means for receiving, from a network node, information comprising an indication of at least one transmission opportunity based on at least one scheduled transmission time of the apparatus; and determining a duration of power saving mode based on the at least one transmission opportunity. The apparatus may further comprise means for performing any example embodiment of the method of the third aspect.

According to a seventh aspect, a computer program may comprise instructions for causing an apparatus to perform at least the following: obtain at least one scheduled transmission time of a client node; compute at least one transmission opportunity for the client node based on the at least one scheduled transmission time and availability of network for the client node; and send information comprising an indication of the at least one transmission opportunity to the client node. The computer program may further comprise instructions for causing the apparatus to perform any example embodiment of the method of the fourth aspect.

According to an eighth aspect, an apparatus may comprise means for obtaining at least one scheduled transmission time of a client node, means for computing at least one transmission opportunity for the client node based on the at least one scheduled transmission time and availability of network for the client node; and sending information comprising an indication of the at least one transmission opportunity to the client node. The apparatus may further comprise means for performing any example embodiment of the method of the fourth aspect.

Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to explain the example embodiments. In the drawings.

Like references are used to designate like parts in the accompanying drawings.

DETAILED DESCRIPTION

Figures 1, 2:
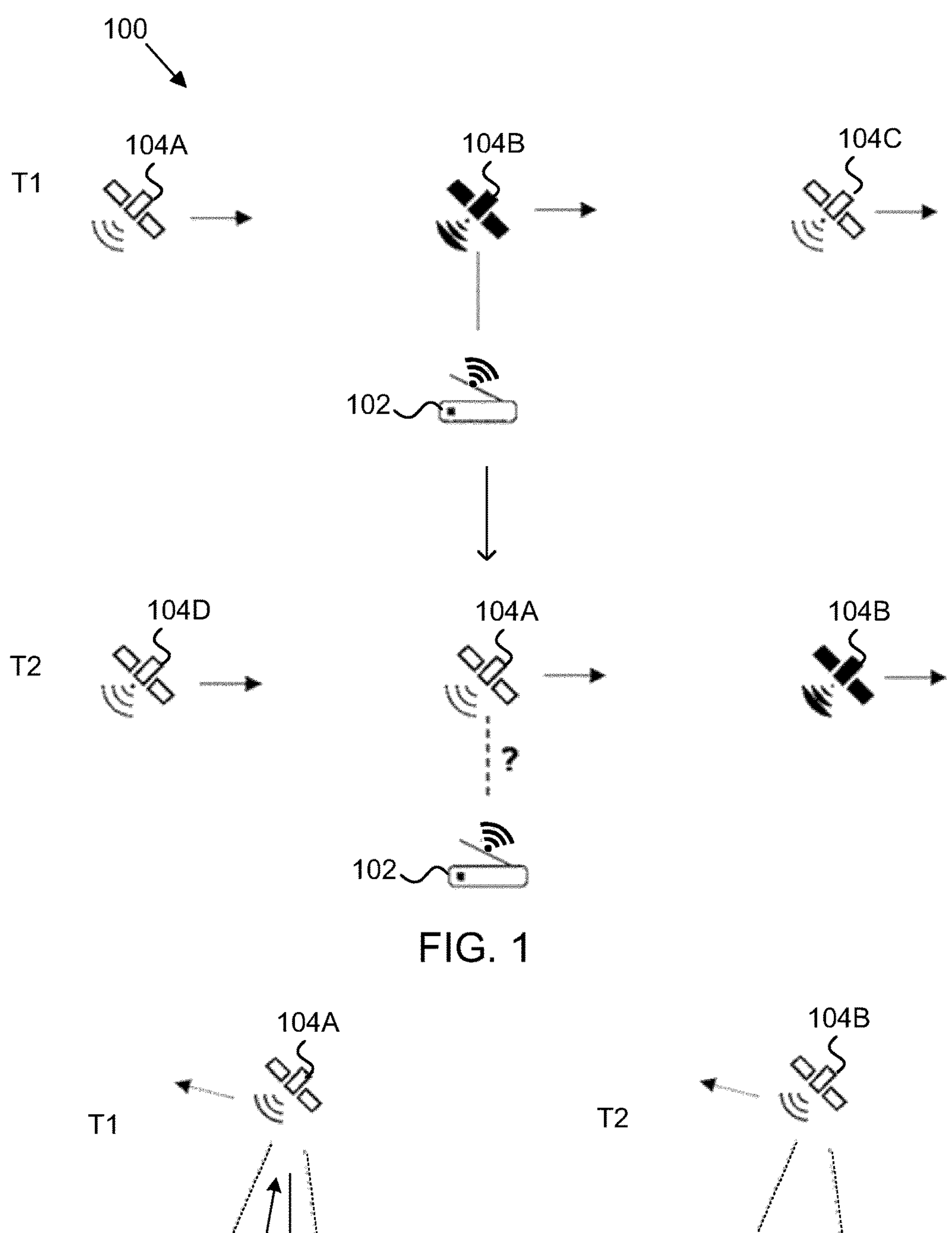
FIG. 1 illustrates an example of positions of satellites before and after a power saving mode of a user equipment according to an example embodiment.
FIG. 2 illustrates an example of signaling procedure between a user equipment and a network for adjusting a power saving mode of the user equipment and obtain cell information according to an example embodiment.

Reference will now be made in detail to example embodiments, examples of which are illustrated in the accompanying drawings. The detailed description provided below in connection with the appended drawings is intended as a description of the present examples and is not intended to represent the only forms in which the present examples may be constructed or utilized. The description sets forth the functions of the example and a possible sequence of operations for constructing and operating the example. However, the same or equivalent functions and sequences may be accomplished by different examples.

Use cases for using satellite constellations for communication are manifold. A main driver is worldwide coverage, in particular in regions without existing network coverage. One of the multiple use cases comprises connecting Internet of Things (IoT) devices via the NTN network. This is in particular relevant in rural areas, where other means of communications may be unavailable. It is estimated there may be 24 million IoT devices via satellite by 2024. The IoT devices may be different types of devices, such as meters or sensors. In general, IoT refers to a network of everyday devices, appliances, and other objects embedded with computer chips and sensors that can collect and exchange data with other devices and systems through the internet.

For most IoT devices, battery consumption is one of the main challenges, especially when placed in remote areas. Many IoT devices send data on a regular basis, but only sporadically. Therefore, while the device has no data to be sent, it enters a sleep/inactive mode to save energy. The sleep mode or inactive mode is a power saving mode of electronic devices, wherein the device may tell the network it is going to go dormant. When the device decides, for example based on some logic or timer, that it is time to transmit, it may wake up and enter an active mode for transmitting to the network. Thereafter, the device may remain in reception (idle) mode for a predetermined idle window so that it can be reachable if needed. Since the device is dormant during the power saving mode, the power consumption of the device may be extremely low. In the power saving mode, power for unneeded subsystems may be cut off and RAM (random-access memory) may be placed into a minimum power state, just sufficient to retain its data. In the idle mode, i.e. not having active transmissions, the device may be using low power, and may perform measurements in order to do cell reselection. No reselections may be done during the power saving mode. The cell reselection may not require the device to become active but may require measurements and reading information from the new cell. Measurement frequency of the device may be lowered to conserve energy.

As stated above, one of the main challenges with regards to the LEO satellites is the movement of the satellites with respect to the Earth surface. The time of connection to one specific satellite decreases with the satellite's altitude. For LEO satellites, the time of the connection may be in the order of minutes.

While the IoT device is in the power saving mode, the satellite can move out of the coverage, as depicted in FIG. 1. FIG. 1 illustrates the movement of satellites 104A, 104B, 104C, 104D while a user equipment (UE) 102 is in the power saving mode. The satellites 104A, 104B, 104C, 104D and the UE 102 may be part of a non-terrestrial communication network 100 comprising network nodes and a client node. The communication network 100 may comprise base stations such as gNBs or relay nodes, which may be hosted on the satellites 104A, 104B, 104C, 104D or other spaceborne or airborne vehicles. The communication network 100 may comprise a global constellation of satellites. Satellites refer to spaceborne vehicles in Low Earth Orbits (LEO), Medium Earth Orbits (MEO), Geostationary Earth Orbit (GEO) or in Highly Elliptical Orbits (HEO). The communication network 100 may further comprise one or more client nodes, which may be also referred to as an IoT device, a user node or UE, such as the UE 102. The UE 102 may communicate with one or more of the base stations via wireless radio channel(s). The satellite base stations may be inter-connected using satellite-to-satellite communication channels. Communications between UE 102 and other network devices, such as the satellite 104A, 104B, 104C, 104D may be bidirectional. Hence, any of the devices may be configured to operate as a transmitter and/or a receiver.

In FIG. 1, before the power saving mode at time T1, the UE 102 may be connected with the satellite 104B. During the power saving mode of the UE 102, the satellites 104A, 104B, 104C, 104D may have moved along their orbit. At time T2 the UE 102 is within a coverage of a new satellite 104A. This means, that a reconnection is needed when the UE 102 wakes up from the power saving mode, i.e. enters from the inactive mode to an active mode for transmission. The new satellite can imply a new cell or new cell parameters, such as timing or doppler compensation offsets. Furthermore, in sparse satellite networks, coverage could be even unavailable at the wake-up time of the UE 102. Moreover, if multiple satellites pass during the power saving mode, the UE 102 might need to reconnect to all of the cells which pass in the meanwhile. The reconnection requires an overhead with respect to signaling and energy consumption, which may be crucial for IoT devices. For example, the UE 102 may perform cell reselections in idle mode, which comprises time and frequency synchronization to all passing cells. This can be cumbersome in the case of NTN, where the cells can change within minutes.

An objective of this disclosure is to address the problem of reconnection and reselections after power saving mode, due to moving base stations or relays. According to an example embodiment, a connection to a new cell at the right point in time may be determined by a client node based on transmission opportunities calculated by a network node. The network node may be configured to provide additional information associated with the transmission opportunity. The additional information enable avoiding a lot of reselections by the client node, which makes the connection faster and cheaper from an energy point of view. The presented procedure may be applicable to devices with long power saving modes, such as meters, with regular but not very frequent transmissions. The device may be configured to transmit, for example, every 5 minutes, every 15 minutes, once a day, or even less frequent.

As stated above, the overhead of reconnecting due to satellite movement should be reduced. An advantage for satellite networks is that the trajectories (i.e. orbits) of the satellites are predictive. Hence, the positions of the satellites in the future may be calculated. As IoT devices may be very simple and need to reduce power consumption as far as possible, this calculation may be done on the network side. In this disclosure, signaling which supports the IoT device, i.e. client node, to activate from the power saving mode for data transmission at the right time is introduced. In an embodiment, the client node may enquire the network about transmission opportunities in a specific future time window. Based on this time window, the network may determine the network availability at this point in time (e.g. in case of a sparse satellite deployment). The time window may be based on, for example, activity time of the client node. The time window may cover at least a start time of the activity mode of the client node. In an embodiment, the network may determine additional information to assists the client node to reconnect. The additional information may comprise, for example, PCI (physical cell ID), time of availability of the network or RACH (random access control channel) opportunities and/or preamble. With this information, the client node may adjust the power saving mode to end at the best transmission opportunity. Further, the client node may already know additional parameters for the situation after the power saving mode based on the additional information. Also, it may not be needed to reconnect to all cells that pass location of the client node during the power saving mode. Hence, the overhead in reconnecting and the energy consumption of the client node may be reduced.

FIG. 2 illustrates an example of a signaling procedure between a client node and a network for adjusting a duration of power saving mode of the client node and obtain cell information according to an example embodiment. The client node may be a UE 102. The UE 102 may be an IoT device, such as a meter reader, a sensor, or the like. The network comprises a plurality network nodes, such as a plurality of satellites 104A, 104B.

The UE 102 may send a message 202 for enquiring the network about transmission opportunities. As devices mostly have regular patterns for sending data, forthcoming transmission times of the UE 102 may be known to the UE 102. The transmission time may be a specific time or time window. Based on the inquiry, the satellite 104A may determine at least one transmission opportunity in terms of network availability, especially in case of a sparse satellite deployment, and/or information assisting the UE 102 to reconnect after the power saving mode. The assisting information may comprise parameters for the reconnection, for example, at least one of a PCI, a time of availability of the network, RACH opportunities or a RACH preamble. The time of availability of the network may comprise an indication of a most suitable time or time slot for sending data by the UE 102. The satellite 104A may send a message 204 to the UE 102 comprising information about the at least one transmission opportunity.

In an embodiment, the UE 102 may inform the network about a transmission interval, or the transmission interval may be known by network. In an embodiment, the network node may observe the same period between transmissions from the UE 102 for some time. The network node may assume that the period will continue and thus it may determine the transmission interval of the UE 102. The network node may send a schedule comprising at least one transmission opportunity based on the transmission interval of the UE 102. Hence, the UE 102 may not need to ask about the transmission opportunities between each power saving and activity mode cycle, but the network may inform the UE 102 about the transmission opportunities independently once a cycle or by providing information about the transmission opportunities over a longer period of time.

In an embodiment, the assisting information may be calculated based on a location of the UE 102 (assuming there is no movement of the UE 102), ephemeris data and the requested time of the transmission opportunity. The ephemeris data may comprise, for example, positions in the sky area and/or speed of the moving network nodes, such as the satellites.

Based on the information, the UE 102 may adapt its power saving mode to end at appropriate time for the transmission based on the received indication of one or more transmission opportunities. In addition, or alternatively, the UE 102 may store the assisting information for reconnecting. For example, the inquiry may comprise an indication that data will be sent by the UE 102 in 15 minutes. The UE 102 may receive from the satellite 104A an indication that next cell is available in 16-17 minutes. The information may further comprise additional information, such as ID of the cell (PCI x) and/or RACH information. The UE 102 may then adjust time length of the power saving mode from the 15 minutes to 16 minutes in order to connect with a next satellite 104B based on the indicated cell at the time of the indicated transmission opportunity.

Figure 3:
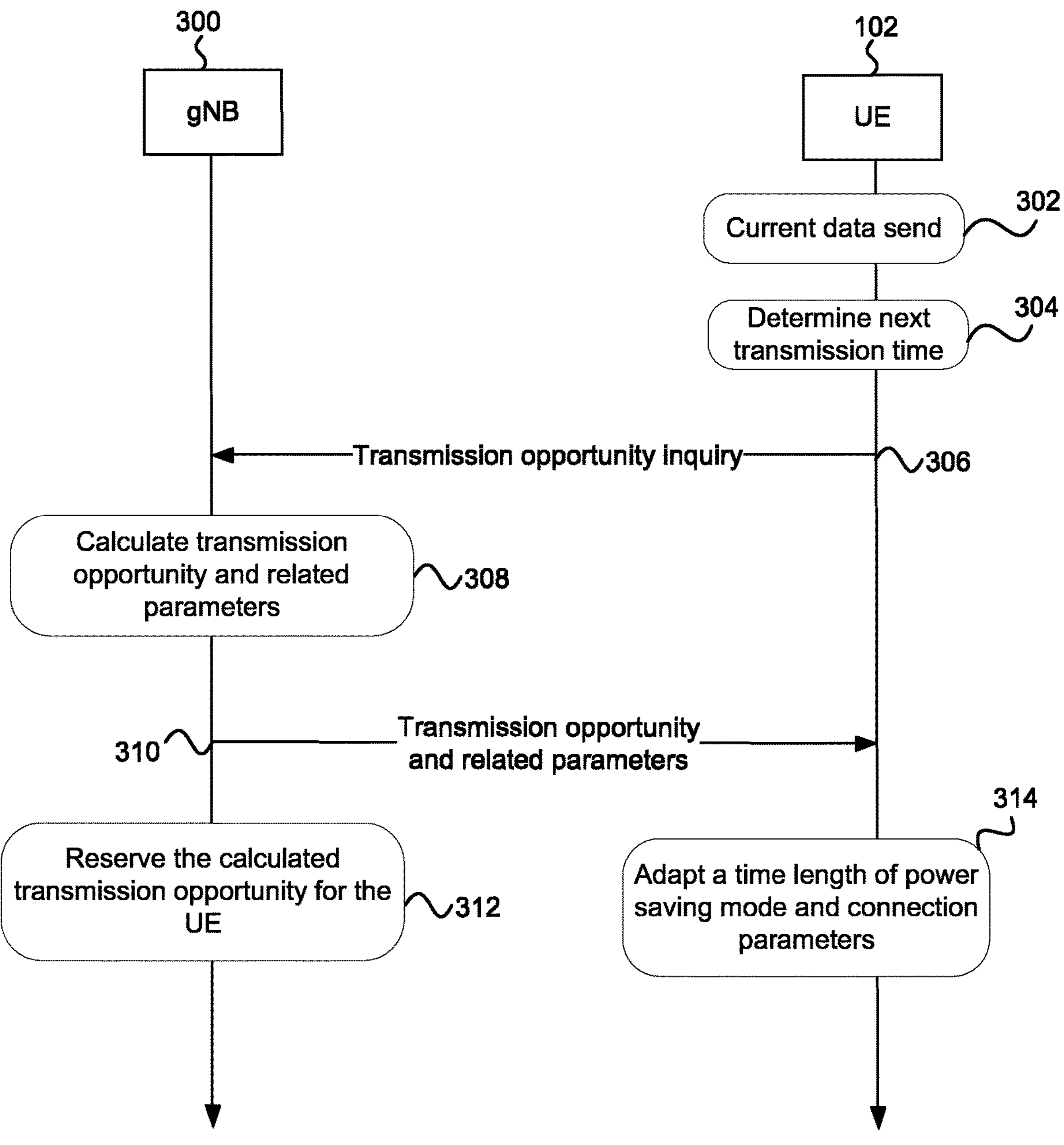
FIG. 3 illustrates an example of a message sequence chart for adapting a duration of power saving mode of a user equipment according to an example embodiment.

FIG. 3 illustrates an example of a message sequence chart for adapting power saving mode of a UE 102 according to an example embodiment. The procedure of FIG. 3 may be performed between a client node, such as the UE 102, and a network node, such as gNB 300, in a non-terrestrial network.

At 302, current data is sent by the UE 102. At 304, the UE 102 proceeds to determine next transmission time. The next transmission time may be determined by the UE 102 based on a regular pattern of the UE 102 for sending data. At 306, the UE 102 may send an inquiry to the gNB 300 about a transmission opportunity based on the next transmission time.

After receiving the inquiry on the next transmission opportunity for the next transmission time from the UE 102, at 308, the gNB 300 may be configured to calculate the next transmission opportunity. The transmission opportunity may be determined, for example, based on movement of gNBs in relation to a location of the UE 102. In an embodiment, the gNB 300 may be configured to calculate parameters related to the next transmission opportunity. At 310, the gNB 300 may be configured to send the calculated transmission opportunity and/or the parameters related to the transmission opportunity to the UE 102. At 312, the gNB 300 may be configured to reserve the calculated transmission opportunity for the UE 102, wherein the specific transmission opportunity may not be allocated to other UEs.

After receiving the transmission opportunity calculated by the gNB 300, the UE 102 may be configured to adapt its preset duration of power saving mode at 314. In an embodiment, the UE 102 may be configured to adapt connection parameters based on the parameters related to the transmission opportunity. The presented procedure may enable reducing the energy consumption for IoT devices with regular transmissions, which may not be frequent. When the IoT device reconnects to the network its power usage may be reduced since the previous transmission, as cell reselections in a non-terrestrial network, comprising for example moving network nodes such as satellites and other devices configured to use spaceborne or airborne platform for communication, may be avoided.

Figure 4:
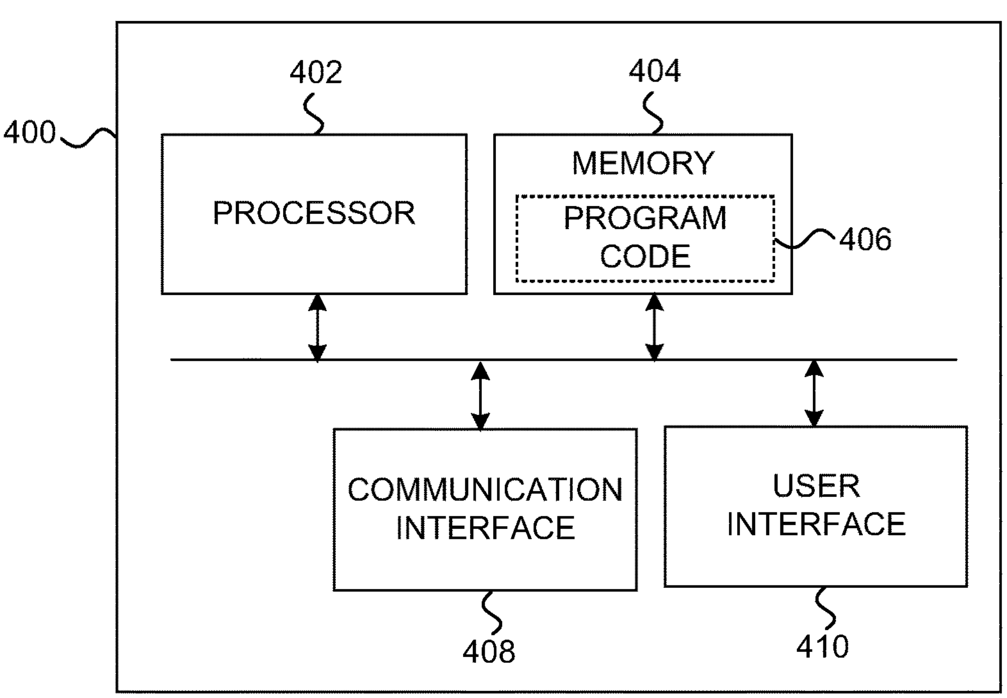
FIG. 4 illustrates an example of an apparatus configured to practice one or more example embodiments.

FIG. 4 illustrates an example of an apparatus 400 configured to practice one or more example embodiments. The apparatus 400 may be a client node, such as for example the UE 102. The apparatus 400 may be a network node, for example, a 5G node, such as the gNB 300 and/or a 4G node, eNB. The apparatus may be a spaceborne or airborne vehicle, such as the satellite 104A, 104B, 104C, 104D, comprising, for example, gNB.

The apparatus 400 may comprise at least one processor 402. The at least one processor 402 may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus 400 may further comprise at least one memory 404. The memory 404 may be configured to store, for example, computer program code 406 or the like, for example operating system software and application software. The memory 404 may comprise one or more volatile memory devices, one or more non-volatile memory devices, and/or a combination thereof. For example, the memory 404 may be embodied as magnetic storage devices (such as hard disk drives, magnetic tapes, etc.), optical magnetic storage devices, or semiconductor memories (such as mask ROM, PROM (programmable ROM), EPROM (erasable PROM), flash ROM, RAM (random access memory), etc.).

The apparatus 400 may further comprise one or more communication interfaces 408 configured to enable apparatus 400 to transmit and/or receive information, to/from other apparatuses. The communication interface 408 may be configured to provide at least one wireless radio connection, such as for example a 3GPP mobile broadband connection (e.g. 3G, 4G, 5G). However, the communication interface 408 may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. The communication interface 408 may comprise, or be configured to be coupled to, at least one antenna to transmit and/or receive radio frequency signals. One or more of the various types of connections may be also implemented as separate communication interfaces, which may be coupled or configured to be coupled to a plurality of antennas.

The apparatus 400 may further comprise a user interface 410 comprising an input device and/or an output device. The input device may take various forms such a keyboard, a touch screen, or one or more embedded control buttons. The output device may for example comprise a display, a speaker, a vibration motor, or the like.

All of the illustrated components are not essential. The apparatus 400 may be implemented by more or less components than those illustrated in FIG. 4.

When the apparatus 400 is configured to implement some functionality, some component and/or components of the apparatus 400, such as for example the at least one processor 402 and/or the memory 404, may be configured to implement this functionality. Furthermore, when the at least one processor 402 is configured to implement some functionality, this functionality may be implemented using program code 406 comprised, for example, in the memory 404.

The functionality described herein may be performed, at least in part, by one or more computer program product components such as software components. According to an embodiment, the apparatus 400 comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (CPUs).

The apparatus 400 comprises means for performing at least one method described herein. In one example, the means comprises the at least one processor 402, the at least one memory 404 including program code 406 configured to, when executed by the at least one processor 402, cause the apparatus 400 to perform the method.

The apparatus 400 may comprise for example a computing device such as for example a base station, a network node, a server device, a client node, a mobile phone, a tablet computer, a laptop, or the like. In one example, the apparatus 400 may comprise a network device configured to use an airborne or spaceborne platform for communication, such as for example a satellite or an unmanned vehicle. Although the apparatus 400 is illustrated as a single device it is appreciated that, wherever applicable, functions of apparatus 400 may be distributed to a plurality of devices.

The client node may be configured to enquire transmission opportunities from the network node. The network node may be configured to calculate the transmission opportunities, for example, based on a location of the client node, trajectories of moving network nodes such as satellites based on mathematical models of the motion of the network nodes and the Earth, and/or a requested transmission time of the client node. The requested transmission time may be based on a regular transmission pattern of the client node. The network node may send the transmission opportunity or opportunities to the client node, for example, in response to the enquiry. Alternatively, or in addition, the network node may send the transmission opportunity or opportunities on its own motion if the network node knows the transmission pattern of the client node. The client node may be configured to change a length of its power saving mode or keep it unchanged based on the next or most suitable time for transmission based on the transmission opportunities. The calculations of transmission opportunities consume power. Further, storing the trajectory data may require a considerable memory space. Hence, it is preferred to perform the calculations by the network node, instead of for example the client node which may have limited battery power and memory.

Figure 5:
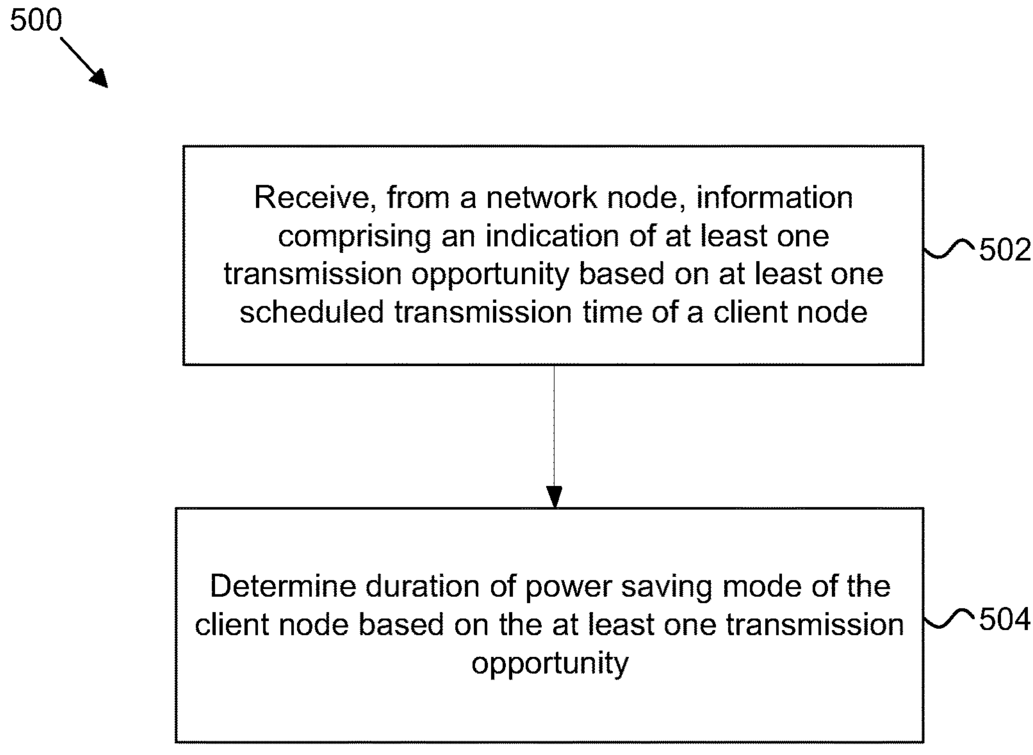
FIG. 5 illustrates an example of a method for adjusting a duration of power saving mode of a user equipment according to an example embodiment.

FIG. 5 illustrates an example of a method 500 for adjusting a duration of power saving mode of a client node according to an example embodiment. The method 500 may be executed by the client node.

At 502, the method may comprise receiving, from the network node, information comprising an indication of at least one transmission opportunity based on at least one scheduled transmission time of the client node. In an embodiment, the method may comprise sending an inquiry to the network node for the transmission opportunities, wherein the at least one scheduled transmission time is indicated in the inquiry.

At 504, the method may comprise determining the duration of power saving mode based on the at least one transmission opportunity.

Figure 6:
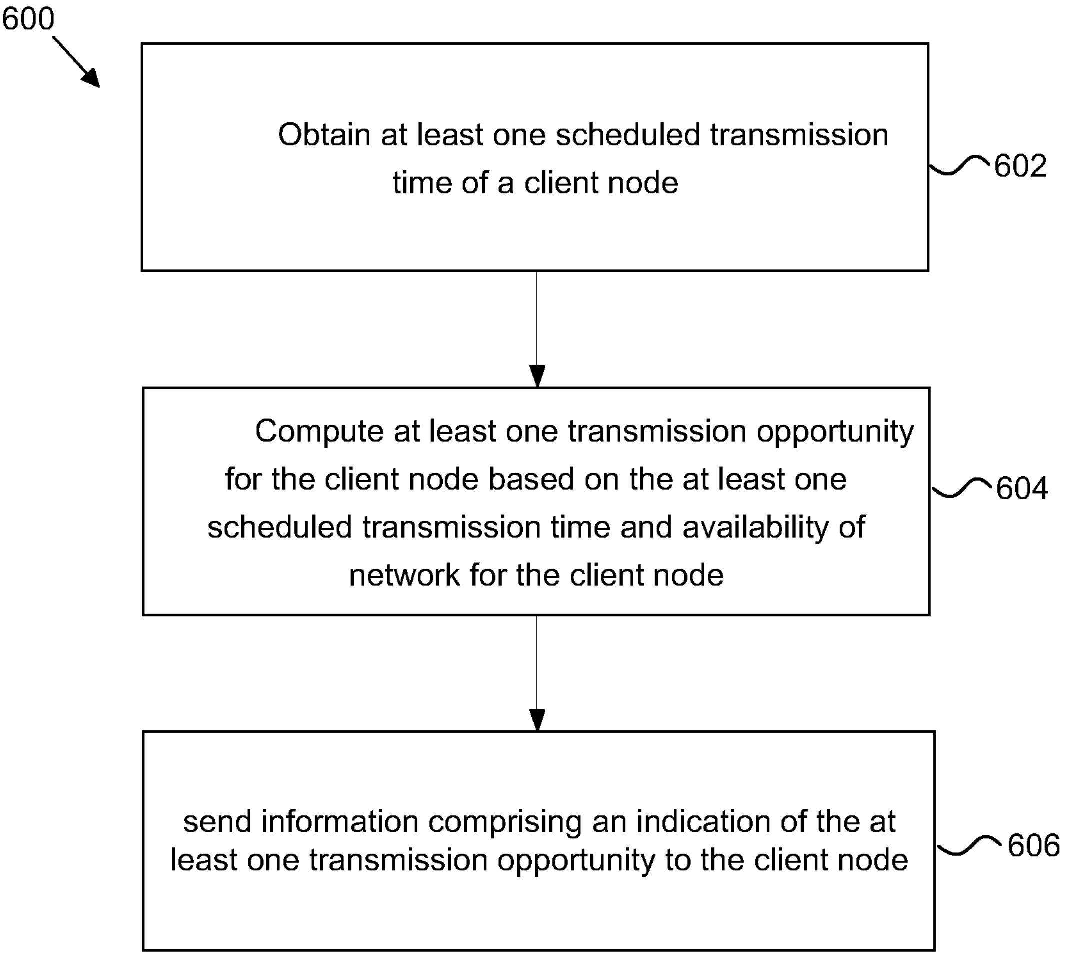
FIG. 6 illustrates an example of a method for assisting in adjusting a duration of power saving mode of a user equipment according to an example embodiment.

FIG. 6 illustrates an example of a method for assisting in adjusting a duration of power saving mode of a client node according to an example embodiment.

At 602, the method may comprise obtaining at least one scheduled transmission time of a client node. In an embodiment, the at least one scheduled transmission time is obtained by the network node based on a transmission time interval of the client node. The transmission time interval may be determined by the network node based on previous transmissions from the client node. In an embodiment, the at least one scheduled transmission time is obtained by the network node based on an inquiry for the transmission opportunities received from the client node. The inquiry may comprise at least one of a next transmission time, a next transmission time window or the transmission time interval of the client node.

At 604, the method may comprise computing at least one transmission opportunity for the client node based on the at least one scheduled transmission time and availability of network for the client node.

At 606, the method may comprise sending information comprising an indication of the at least one transmission opportunity to the client node.

Further features of the methods directly result from the functionalities and parameters of the apparatuses, as described in the appended claims and throughout the specification and are therefore not repeated here. It is noted that one or more operations of the method may be performed in different order.

An apparatus, for example a network node, a user node or a client node, may be configured to perform or cause performance of any aspect of the method(s) described herein. Further, a computer program may comprise instructions for causing, when executed, an apparatus to perform any aspect of the method(s) described herein. Further, an apparatus may comprise means for performing any aspect of the method(s) described herein. According to an example embodiment, the means comprises at least one processor, and memory including program code, the at one memory and the program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

What is claimed is:

1. A client node, comprising:

at least one processor; and at least one memory including computer program code;

the at least one memory and the computer program code being configured to, with the at least one processor, cause the client node at least to:

based on a regular transmission pattern of the client node, determine at least one scheduled transmission time comprising a next transmission time of the client node, a next transmission time window of the client node, or a transmission time interval of the client node for sending data;

send, prior to the client node entering a power saving mode, an inquiry to a network node for transmission opportunities, wherein the network node is a base station in a non-terrestrial network (NTN) hosted on a moving platform, and wherein the inquiry comprises an indication of the at least one scheduled transmission time of the client node;

receive, from the network node, information calculated by the network node based on a static location of the client node and ephemeris data of moving network nodes, the information comprising an indication of at least one transmission opportunity based on the at least one scheduled transmission time of the client node and assisting parameters associated with the at least one transmission opportunity for reconnection after the power saving mode without performing cell reselection, wherein the ephemeris data comprises predicted orbital positions and velocities of the moving network nodes, wherein the assisting parameters comprise:

a physical cell identity of a new cell to connect to after the power saving mode, a time of availability of the network node, wherein the time of availability of the network node comprises an indication of a time for the transmission by the client node or a time slot for the transmission by the client node, random access control channel opportunities, and a random access control channel preamble;

store the assisting parameters for use upon exiting the power saving mode; and based on the at least one transmission opportunity and the assisting parameters, adjust a duration of the power saving mode of the client node by extending the duration to align a wake-up time of the client node with a transmission opportunity that is later than the at least one scheduled transmission time, wherein the transmission opportunity is with a new satellite different from a satellite with which the client node was previously connected.

2. The client node of claim 1, wherein the indication of the at least one transmission opportunity is further based on a predicted period of network availability for the static location of the client node in a sparse satellite deployment, and wherein the assisting parameters further comprise at least one of a timing compensation offset or a doppler compensation offset for connecting to the new cell of the new satellite.

3. The client node of claim 1, wherein the information received from the network node in response to the inquiry further comprises a schedule of a plurality of transmission opportunities of the client node, each of the plurality of transmission opportunities corresponding to one of a plurality of future scheduled transmission times of the client node, and wherein the client node is further configured to: enter the power saving mode between each of the plurality of scheduled transmission times without sending a subsequent inquiry; and place a random-access memory (RAM) of the client node into a minimum power state sufficient to retain the data during the power saving mode.

4. A base station in a non-terrestrial network (NTN) hosted on a a low-earth-orbit satellite hosting a gNB, the base station comprising:

at least one processor; and at least one memory including computer program code;

the at least one memory and the computer program code being configured to, with the at least one processor, cause the base station at least to:

receive, from a client node prior to the client node entering a power saving mode, an inquiry for transmission opportunities, the inquiry indicating at least one scheduled transmission time of the client node, wherein the at least one scheduled transmission time comprises a next transmission time of the client node, a next transmission time window of the client node, or a transmission time interval of the client node for sending data, and wherein the at least one scheduled transmission time is determined based on a regular transmission pattern of the client node;

predict orbital movement of the low-earth-orbit satellite relative to a surface location on Earth of the client node;

based on a static location of the client node and ephemeris data of moving network nodes, compute at least one transmission opportunity and assisting parameters associated with the at least one transmission opportunity for reconnection of the client node after the power saving mode; and send, to the client node, information comprising an indication of the at least one transmission opportunity and the assisting parameters, wherein the at least one transmission opportunity is reserved for the client node to an exclusion of other client nodes, wherein the at least one transmission opportunity is for a time later than the at least one scheduled transmission time and is with a new satellite different from a satellite with which the client node was previously connected upon entering the power saving mode, wherein the information enables the client node to reconnect without performing cell reselection, and wherein the assisting parameters comprise:

a physical cell identity of a new cell to connect to after the power saving mode, a time of availability of a network node, wherein the time of availability of the network node comprises an indication of a time for the transmission by the client node or a time slot for the transmission by the client node, random access control channel opportunities, and a random access control channel preamble.

5. The base station of claim 4, wherein the at least one memory and the computer code are further configured to, with the at least one processor, cause the base station to:

reserve the at least one transmission opportunity to the client node.

* * * * *